US006719087B2

(12) United States Patent
Demerly

(10) Patent No.: US 6,719,087 B2
(45) Date of Patent: Apr. 13, 2004

(54) CONTROL OF INDEPENDENT STEERING ACTUATORS TO IMPROVE VEHICLE STABILITY AND STOPPING

(75) Inventor: Jon Dee Demerly, Byron, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/781,678

(22) Filed: Feb. 12, 2001

(65) Prior Publication Data

US 2001/0032748 A1 Oct. 25, 2001

Related U.S. Application Data

(60) Provisional application No. 60/181,972, filed on Feb. 11, 2000, and provisional application No. 60/225,095, filed on Aug. 14, 2000.

(51) Int. Cl.$^7$ ................................................ B60T 8/00
(52) U.S. Cl. .................... 180/402; 701/76; 280/86.758; 280/5.522
(58) Field of Search ............................ 280/86.758, 5.52, 280/5.521, 5.522; 180/402, 282; 701/41, 43, 72, 76

(56) References Cited

U.S. PATENT DOCUMENTS

| | | | |
|---|---|---|---|
| 2,351,935 A | * | 6/1944 | Devlin et al. |
| 4,237,994 A | | 12/1980 | McColl |
| 4,786,066 A | | 11/1988 | Kondo et al. |
| 4,811,969 A | * | 3/1989 | Sugiyama .................... 280/701 |
| 4,902,032 A | | 2/1990 | Krehan et al. |
| 5,088,662 A | * | 2/1992 | Appleberry .................. 244/111 |
| 5,143,400 A | * | 9/1992 | Miller et al. ................. 280/661 |
| 5,653,304 A | * | 8/1997 | Renfroe ....................... 180/402 |
| 5,884,724 A | | 3/1999 | Bohner et al. |

FOREIGN PATENT DOCUMENTS

| | | | |
|---|---|---|---|
| EP | 0 333 108 A2 | | 9/1989 |
| EP | 0 512 591 A1 | | 11/1992 |
| FR | 2 684 606 | | 6/1993 |
| JP | 3-178880 | * | 8/1991 |
| JP | 4-345515 | * | 12/1992 |
| JP | 5-77626 | * | 3/1993 |
| JP | 5-139138 | * | 6/1993 |

* cited by examiner

Primary Examiner—Avraham Lerner
(74) Attorney, Agent, or Firm—Michael D. Smith

(57) ABSTRACT

An independent steering and/or braking control to improve motor vehicle stability and stopping utilizes a steer-by-wire system that includes a steering input system, a controller in electronic communication with the steering input system, and a plurality of roadwheel systems. Each of the roadwheel systems is in electronic communication with the controller, and each roadwheel system includes a steering actuator and a steerable wheel rotatably and operably connected to the steering actuator. The steerable wheel is configured to be angled independent of other steerable wheels and relative to a direction of travel of the motor vehicle. A method of stopping the motor vehicle as it travels includes angling a pair of the steerable wheels thereof in opposing directions. The direction of the motor vehicle can also be controlled by angling the pair of steerable wheels in opposing directions and adjusting the angle of the pair of steerable wheels If the motor vehicle is articulating a turn, its direction of travel can also be controlled by angling one of the steerable wheels and steering with the other of the steerable wheels. In addition, the angle of the steerable wheels can be adjusted to compensate for lateral disturbance without driver involvement.

23 Claims, 4 Drawing Sheets

CONTROL OF INDEPENDENT STEERING ACTUATORS TO IMPROVE VEHICLE STABILITY AND STOPPING

CROSS REFERENCE TO RELATED APPLICATIONS

This application claims the benefit of an earlier filing date from U.S. Provisional Application No. 60/181,972 filed Feb. 11, 2000, and U.S. Provisional Application No. 60/225,095 filed Aug. 14, 2000, both of which are incorporated herein by reference.

TECHNICAL FIELD

This disclosure relates to automobile steering systems, and, more particularly, to a steer-by-wire system and the optimization of vehicle performance through the consideration of overall vehicle response in relation to a slip angle curve.

BACKGROUND

Traditionally, steering systems and braking systems for motor vehicles have each relied on the independent actuation of groups of components within the motor vehicle. Each group actuated typically has a single function by which control of the motor vehicle is maintained. For example, with respect to steering systems, at least the front steerable wheels have been traditionally mechanically linked together and are synchronously steerable. In systems utilizing four-wheel steering, typically the front wheels are mechanically linked to each other and are synchronously steerable while the back wheels, although they are in electronic communication with the front wheels and provide an angle of steering relative to the front wheels, are likewise mechanically linked to each other and synchronously steerable. In the electronic braking systems currently utilized, electronics evoke a response from hydraulic systems that apply the braking action to the wheels of the motor vehicle. During normal braking with an electronic braking system, a system computer interprets an operator input (driver stepping on the brake pedal), and a signal is transmitted to mechanical actuators to apply the brakes. With regard to the typical vehicle configuration, the braking traditionally remains independent of the steering and the steering traditionally remains independent of the braking. When the motor vehicle experiences either function, the other remains the responsibility of the operator.

The steering and braking functions of the traditional motor vehicle are related through the wheels of the motor vehicle. A typical motor vehicle wheel has a force versus slip angle curve (shown below with reference to FIG. 1) associated therewith that characterizes the lateral force applied to the wheel as a function of the angle at which the wheel "slips" on the surface over which it moves. Such movement of the wheel is defined by a positively sloped curve for low slip angles, a peak, and a negatively sloped curve for high slip angles. In traditional steering systems that steer a set of at least two wheels in unison, a motor vehicle is generally not operated beyond the peak force. When the motor vehicle is operated beyond the peak force, however, it experiences a limit-handling condition in which operator control of the motor vehicle is compromised.

SUMMARY

Steer-by-wire systems capable of steering the steerable wheels of a motor vehicle independently of each other, although not having been used in this manner heretofore, open new possibilities in vehicular control, viz., the effective operation of the motor vehicle over the entire range of the force versus slip angle curve, and, in particular, the effective operation of the motor vehicle in the negative slope area of the curve beyond the peak. Such an operation allows for the use of the motor vehicle steering as a backup to the braking.

A system for steering a motor vehicle includes a steering input system, a controller in electronic communication with the steering input system, and a plurality of roadwheel systems. Each of the roadwheel systems is in electronic communication with the controller, and each roadwheel system includes a steering actuator and a steerable wheel rotatably and operably connected to the steering actuator. The steerable wheel is configured to be angled relative to a direction of travel of the motor vehicle.

The controller of the system includes at least one input port configured to receive inputs either from an operator of the motor vehicle or from the vehicle itself. It also includes provisions for normal steering control in electronic communication with the input port and failed brake steering control in electronic communication with the input port. The failed brake steering control has provisions for both first and second failed brake steering controllers, both of which are in electronic communication with the steering actuator of the system. The first failed brake steering controller is configured to allow for the braking of the motor vehicle followed by the steering of the motor vehicle, while the second failed brake steering controller is configured to allow for the steering of the motor vehicle followed by the braking of the motor vehicle. The controller manages the coordination between normal steering control and failed brake steering control, as well as coordination between the first failed brake steering controller and the second failed brake steering controller.

A method of stopping the motor vehicle during travel includes angling a pair of the steerable wheels thereof in opposing directions, either away from each other or toward each other. As the angle of the steerable wheels increases, an increasing portion of the lateral force on the wheels acts in the longitudinal direction of the vehicle, thus slowing the vehicle. The direction of the motor vehicle can also be controlled by angling the pair of steerable wheels in opposing directions for stopping and adjusting the angle of the pair of steerable wheels. Alternatively, the direction of the motor vehicle can also be controlled by angling one of the steerable wheels for stopping and steering the motor vehicle with the other of the steerable wheels. In a preferred embodiment, the steerable wheel being angled is on the outside of the turn and the steerable wheel on the inside of the turn is used to steer the motor vehicle. In addition, it is preferred to have the steerable wheels angled toward the center of the vehicle as opposed to being angled away from the center of the vehicle.

Because the automobile industry is driven by consumer interest, and because improved vehicle performance is a desirable factor relating to such an interest, the industry is drawn to developing technology that allows a motor vehicle operator to experience improved vehicle performance without requiring that the operator expend any effort in an attempt to change his method of driving. The technological advancements illustrated by the use of the above-described system enable improved vehicle performance as a result of the objective control of the motor vehicle maintained by the electronics of a by-wire system without requiring any change to the inputs from the driver.

DETAILED DESCRIPTION

An independent steering system of a motor vehicle allows for emergency braking using the steering function as well as assisted steering to provide desired lateral response of the motor vehicle. The system is designed to utilize separate controlling actions taken at the individual steerable wheels of the motor vehicle. Such separation of controlling actions (which may include, for example, equal or unequal toe in/toe out conditions or the steering of each wheel at varying angles) allows for increased vehicle stability, superior safety aspects, and improved performance and handling capabilities. Although reference is made to a motor vehicle in which only the front wheels are steerable, the principles outlined below are applicable to vehicles incorporating rear steering or all-wheel steering as well.

Figure 1:
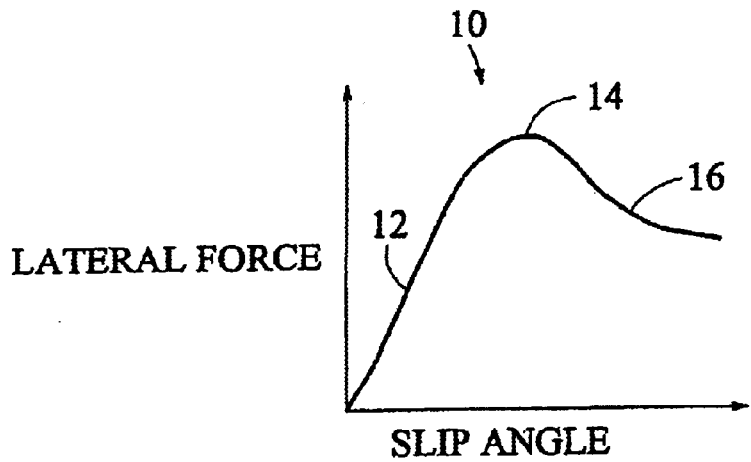
FIG. 1 is a graphical interpretation of a slip angle curve.

Referring to FIG. 1, a graphical interpretation of the lateral force applied to a wheel (not shown) as a function of the slip angle of the wheel is known as a slip angle curve, shown generally at 10. Slip angle curve 10 is characterized by a positive slope section 12, a peak 14, and a negative slope section 16. A conventional motor vehicle (not shown) functions such that the wheels thereof operate in the range of slip angle curve 10 that is in positive slope section 12 and well below peak 14, only operating in the negative slope section 16 in rare occurrences of a limit-handling condition. However, in a motor vehicle (not shown) that incorporates independent steering capability, the wheels thereof may operate virtually anywhere on slip angle curve 10, including in negative slope section 16, without experiencing a limit-handling condition. To operate the wheels in such a manner, the net affect of operating the steerable wheels at independent slip angles is taken into account in order to determine the optimum performance of the motor vehicle for a given set of operator inputs. The performance of the motor vehicle in such an application typically includes motor vehicle response to various failure modes, such as brake failure.

Figure 2:
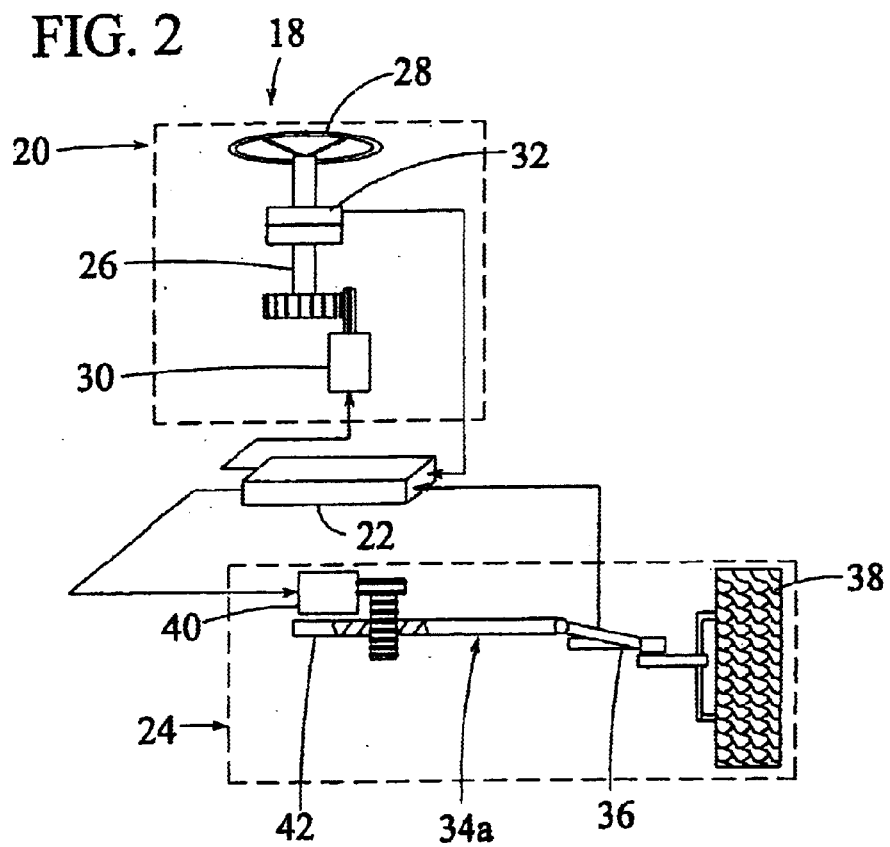
FIG. 2 is a schematic drawing of a steer-by-wire system.

Referring to FIG. 2, a steer-by-wire system is shown generally at 18. Steer-by-wire system 18 is incorporable into a motor vehicle (shown below with reference to FIG. 3) and comprises a steering input system, shown generally at 20, a control system 22, and at least two roadwheel systems, one of which is shown generally at 24. Steering input system 20 comprises a steering column 26, a steering device 28 disposed on steering column 26, a resistance torque mechanism 30 disposed on steering column 26, and sensors 32 disposed on steering column 26. Steering device 28 may be a steering handwheel. Sensors 32 providing torque and/or position information are in electronic communication with control system 22, which is in turn in electronic communication with roadwheel system 24. Roadwheel system 24 comprises a steering actuator, shown generally at 34a, which receives the electronic communication from control system 22, a linkage assembly 36 operably connected to steering actuator 34a, and steerable wheel 38 rotatably connected to linkage assembly 36. Steering actuator 34a comprises a drive motor 40 and a rack 42 in driving communication with drive motor 40. The position and/or force of steerable wheel 38 are sensed by sensors (not shown), which are communicated back to resistance torque mechanism 30 of steering input system 20 through control system 22 in order to provide the operator of the motor vehicle with information pertaining to the positioning and/or force of steerable wheel 38. FIG. 2 gives an example of a steer-by-wire system, but certainly other mechanizations relating driver input to position of the steerable wheels are also applicable.

Figure 3:
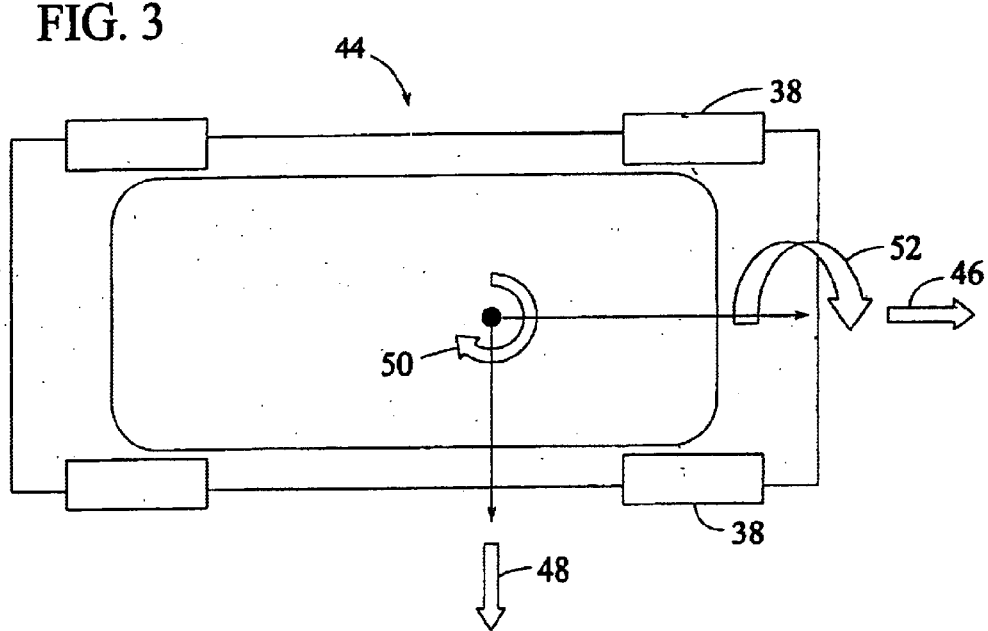
FIG. 3 is a schematic drawing of a motor vehicle under normal operation in a longitudinal direction.

In FIG. 3, a motor vehicle is shown generally at 44. In the normal operation of motor vehicle 44 in the direction of a first arrow 46 (the longitudinal velocity of motor vehicle 44), the forces acting thereon in the directions of a second arrow 48 (the lateral velocity), a third arrow 50 (the vehicle heading angle), and a fourth arrow 52 (the vehicle roll angle) are all substantially zero. Such an operation allows for straight line travel of motor vehicle 44 with each front steerable wheel 38 rotating about its spin axis and supporting motor vehicle 44.

Figure 4:
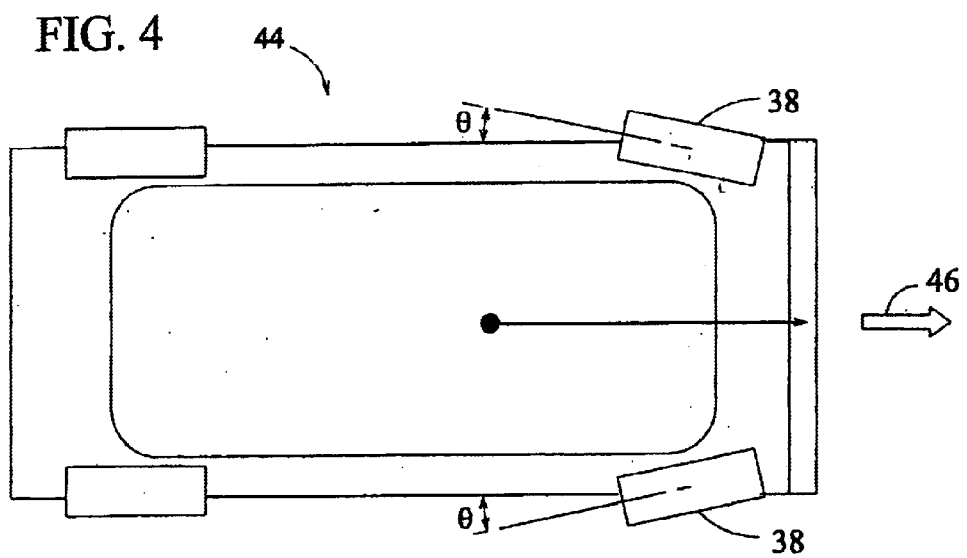
FIG. 4 is a schematic drawing of the motor vehicle in a braking operation in which the front steerable wheels are "toed-in".

Referring now to FIG. 4, in the operation of motor vehicle 44 in the direction as described in FIG. 3 and in which a braking operation is effectuated using the steer-by-wire system, each front steerable wheel 38 is angled by its respective steering actuator to provide optimum stopping capabilities to motor vehicle 44. The angling is achieved by altering the planes in which each steerable wheel 38 rotates such that each steerable wheel 38 is angled out of the plane in which motor vehicle 44 is traveling with respect to first arrow 46. Angling of steerable wheels 38 toward each other creates a "toed-in" effect, and angling steerable wheels 38 to the maximum angle allowable provide the greatest level of deceleration of motor vehicle 44 traveling in the direction of first arrow 46. The specific angle that each steerable wheel 38 is moved relative to the body of motor vehicle 44 is typically up to about 40 degrees. The steering actuators also can be configured to angle each steerable wheel 38 in the opposing direction (not shown) in order to create a "toeing-out" effect. Regardless of toe-in or toe-out, the maximum deceleration level achievable for motor vehicle 44 is on the order of about 0.3 to about 0.4 g for the above maximum angle. Although this amount of deceleration is typically not as much as a conventional braking system can provide, it may be sufficient to provide emergency braking for motor vehicle 44 in the event of a malfunction in the braking system.

Figure 5:
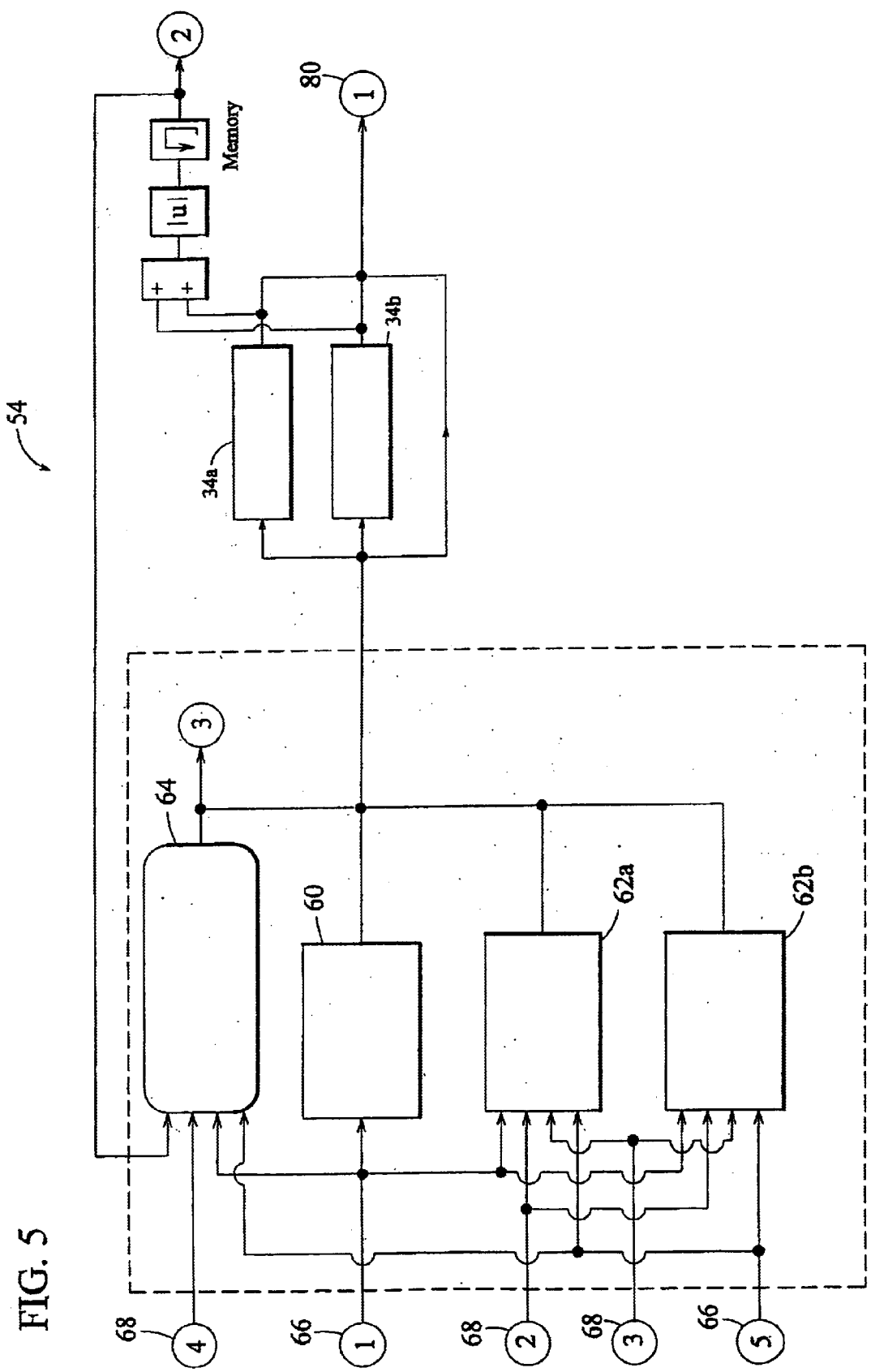
FIG. 5 is a schematic drawing of the componentry of the steer-by-wire system.

Referring to FIG. 5, the componentry of the steer-by-wire system is shown schematically and generally at 54. In addition to braking, the system provides compensation for providing a desired lateral response of a motor vehicle. Componentry 54 of the system, which is preferably integrated into the controller, comprises a normal steering control 60, failed brake steering controllers 62a, 62b, and a transition element 64, all of which are in electronic communication with first steering actuator 34a and at least a second steering actuator 34b. In the case of a four-wheel steering system (not shown), inputs would also be communicated to third and fourth actuators (not shown). Each actuator 34a, 34b acts independent of the other. Normal steering control 60, failed brake steering controllers 62a, 62b, and transition element 64 each receive inputs 66 from the operator of the motor vehicle as well as inputs 68 from the vehicle itself and communicate information to actuators 34a, 34b. Actuators 34a, 34b provide an output in the form of a steer angle 80 to the steerable wheels.

Under normal conditions with brakes functioning, the system operates similar to one with linked wheels with both wheels turning in the same direction. The difference from a linked wheel system is that the proposed system can compensate for lateral disturbances by turning one or more of the steerable wheels in response to such a disturbance. Examples of such disturbances may include braking on a road surface having a non-uniform coefficient of friction, wind gusts, road unevenness, and others. By comparing the desired vehicle lateral response, such as yaw rate, against the actual response the error between the two can be used to adjust the angle of at least one steerable wheel in order to correct for the disturbance and provide the desired response. Such corrections are made independent of the driver and without requiring any driver action.

Figure 6:
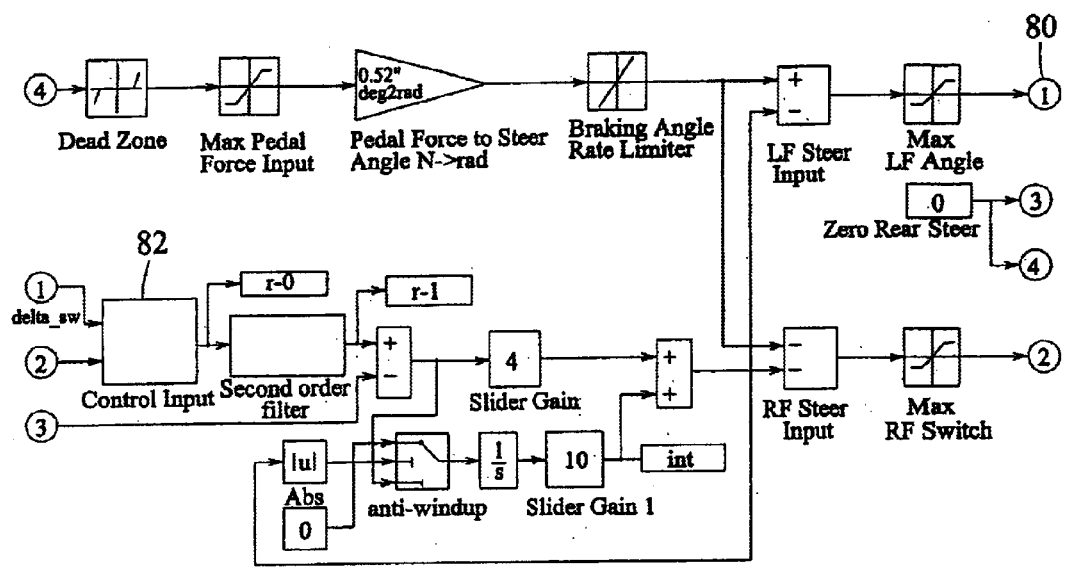
FIG. 6 is a schematic drawing of the componentry of a failed brake steering controller configured to brake a motor vehicle and then steer the motor vehicle.

Referring now to FIG. 6, independent inputs may be made at each steerable wheel such that the steerable wheels may experience combinations of toe-in and steering at normal steer angles in order to effectuate braking and directional response of the motor vehicle. In FIG. 6, a first failed brake steering controller is shown generally at 62a. First failed brake steering controller 62a is preferred for braking of a motor vehicle followed by steering of the motor vehicle. When using this approach, when the wheels of a motor vehicle are turned in a first direction, response of the motor vehicle is in the opposite direction. In order to correct such errant behavior of the motor vehicle, the steerable wheels are turned inward to a minimum angle upon application of a brake pedal force that exceeds a normal brake pedal force and are then turned in the opposite direction of the desired vehicle lateral response. The minimum angle chosen guarantees that the steerable wheels will operate at or beyond the peak lateral wheel force (as illustrated with reference to FIG. 1 above). Turning the steerable wheels in the opposite direction of the steering wheel input causes the vehicle to respond in the desired direction. A combination of proportional and integral control is used to obtain the final angle for the steerable wheels, the angles of which are subtracted from the angles that each wheel is operating due to the brake pedal force.

Figure 7:
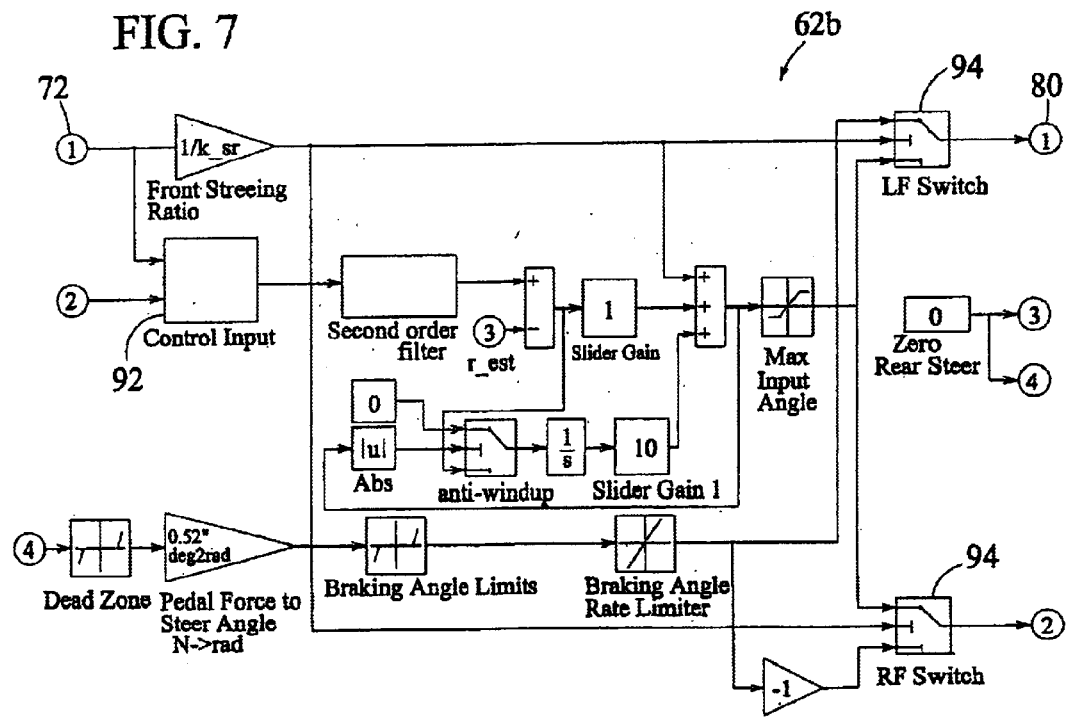
FIG. 7 is a schematic drawing of the componentry of a failed brake steering controller configured to steer a motor vehicle and then brake the motor vehicle.

Referring now to FIG. 7, when a motor vehicle is articulating a turn, one of the steerable wheels may be held angled and rotatably fixed relative to a body of the motor vehicle in order to provide braking while the other of the steerable wheels may be angled in response to input from either the driver or the controller in order to provide steering control of the motor vehicle. In such a situation, since the lateral forces exerted on the road surface (regardless of the coefficients of friction of the road surfaces adjacent each steerable wheel) no longer offset each other, the motor vehicle is subject to movement in both the lateral and longitudinal directions. Preferably, the outside wheel during a turn is used to provide the braking aspect, while the inside wheel is used to provide the steering. In such a configuration, more weight is exerted on the outside wheel, thus allowing the outside wheel to generate higher forces on the road surface. The generation of higher forces by the braking wheel allows for a higher deceleration rate of the motor vehicle to be realized. Peak deceleration is realized by the angling of the braking road wheel to its maximum. The angle of the braking wheel is determined by the amount of brake pedal input while the angle of the steered wheel is based upon the desired vehicle lateral response.

In FIG. 7, second failed brake steering controller is shown at 62b. Second failed brake steering controller 62b is preferred for steering of a motor vehicle followed by braking of the motor vehicle. When using this approach, the controller 62b takes into consideration the selection of which steerable wheel is used to stop and which steerable wheel is used to steer, based upon the direction in which the motor vehicle is turning. This is achieved through the use of switches 94 that change the input for each steerable wheel based upon the sign of commanded steer angle 72. Switches 94 enable a change in the input for each steerable wheel based upon the sign of the angle of the steering hand wheel. Steering hand wheel angle and speed of the motor vehicle are then fed into a lookup table 92 to obtain the desired yaw rate for the motor vehicle, which is subsequently compared to the actual yaw rate of the vehicle. The associated error is used to adjust the angle of the steerable wheels by turning the steerable wheels in the proper direction. Operation of second failed brake steering controller 62b is similar to that of the first failed brake steering controller; however, a combination of proportional and integral control, as well as a ratio between a feedforward value associated with the steering hand wheel angle and steering ratio, are used. The feedforward value is used to bring the nominal angle of the steerable wheel to the same value as it would be under normal steering operation. Such a use improves the performance of the motor vehicle since the steered steerable wheel should already be close to the necessary angle when control begins. Although proportional plus integral control is used here for simplicity, other types of control could also be used. Also, yaw rate is used here as the measure of vehicle lateral response, but other measures could be used if desired.

Because the automobile industry is driven by consumer interest, and because a reduction in unit cost and improved motor vehicle performance are always desirable factors relating to such an interest, the industry is drawn to developing solutions that are cost effective. The development of solutions such as those described above in which control of the motor vehicle is a function of at least two independent systems enables various reductions in hardware to be made at the manufacturing level of the motor vehicle, thereby lowering the cost to the consumer while providing improved motor vehicle performance. Furthermore, the incorporation of a steer-by-wire system as described above into a motor vehicle provides added levels of comfort and security due to the added benefit that braking can be provided through the steering system in order to stop the motor vehicle in the event that a malfunction occurs in the braking system.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of directional control of a motor vehicle moving through a turn, comprising:

angling a first steerable wheel with respect to a first pivot to brake said motor vehicle;

steering said motor vehicle with a second steerable wheel opposite said first steerable wheel with respect to a second pivot, said first and second pivots substantially aligned defining a lateral direction relative to the motor vehicle;

wherein said angling a first steerable wheel is in response to an operator input to a braking system within the motor vehicle.

2. The method of claim 1, wherein said first independently steerable wheel may be angled up to about 40 degrees relative to the body of the motor vehicle.

3. The method of claim 1, wherein an angle of said first steerable wheel is determined by an amount of said operator input to said braking system.

4. The method of claim 3, wherein said angle of said first steerable wheel is determined by an amount of said operator input to a brake pedal.

5. The method of claim 3, wherein a steer angle of said second independently steerable wheel is based upon a desired vehicle lateral response.

6. The method of claim 1, wherein said first independently steerable wheel is an outside wheel and said second independently steerable wheel is an inside wheel relative to a turn the motor vehicle is articulating.

7. The method of claim 1, wherein a controller selects between one of said two independently steerable wheels disposed on opposite sides of the motor vehicle, to control said braking while the other is selected to control said steering.

8. The method of claim 7, wherein said controller selection is based upon a direction that motor vehicle is turning.

9. The method of claim 8, wherein said controller selects an outside wheel of said two independently steerable wheels to control said braking and selects an inside wheel of said two independently steerable wheels to control said steering relative to a turn being negotiated.

10. The method of claim 1, wherein said angling a first independently steerable wheel is toward a front center of the motor vehicle.

11. The method of claim 1, wherein said pair of independently steerable wheels is a front pair of steerable wheels.

12. The method of claim 1, wherein said first and second independently steerable wheels operate at independent slip angles.

13. The method of claim 1, wherein said first angling a first independently steerable wheel includes operably angling said first independently steerable wheel to operate in a negative slope area of a force vs. slip angle curve while maintaining effective directional control of the motor vehicle with said second independently steerable wheel.

14. The method of claim 1, wherein said steering said motor vehicle with a second independently steerable wheel allows effective directional control of the motor vehicle while said angling a first independently steerable wheel operates in a negative slope area of a force vs. slip angle curve to increase braking of the motor vehicle with said first independently steerable wheel.

15. A method of decelerating a moving motor vehicle, comprising:

sensing an operator input to a braking system within the motor vehicle; and angling a pair of independently steerable wheels in opposing directions to brake the motor vehicle, said pair of independently steerable wheels configured to change a travel direction of the motor vehicle, wherein an amount of said angling of said pair of steerable wheels is variable in direct response to said sensing an operator input to a braking system within the motor vehicle.

16. The method of claim 15, wherein said pair of independently steerable wheels may be angled up to about 40 degrees relative to the body of the motor vehicle.

17. The method of claim 15, wherein said pair of independently steerable wheels is a front pair of steerable wheels.

18. The method of claim 15, wherein said angling of a pair of independently steerable wheels towards each other creates an angle therebetween determined by an amount of said operator input to said braking system.

19. The method of claim 18, wherein as said angle increases, an increasing portion of a lateral force on each wheel acts in a longitudinal direction of the motor vehicle.

20. The method of claim 15, wherein an angle between said pair of independently steerable wheels towards each other is determined by an amount of said operator input to said braking system.

21. The method of claim 20, wherein said angle between said pair of independently steerable wheels towards each other is determined by an amount of said operator input to a brake pedal.

22. The method of claim 15, wherein a steer angle of said pair of independently steerable wheels in opposing directions to brake the motor vehicle is modified relative to the body of the motor vehicle based upon a desired vehicle lateral response.

23. The method of claim 15, wherein a steer angle of said pair of independently steerable wheels in opposing directions to brake the motor vehicle is modified relative to the body of the motor vehicle based upon a desired yaw rate.

* * * * *